United States Patent [19]

Burgdorf

[11] 4,411,477

[45] Oct. 25, 1983

[54] TWO-CIRCUIT PRESSURE CONTROL UNIT FOR HYDRAULIC BRAKE SYSTEMS

[75] Inventor: Jochen Burgdorf, Offenbach, Fed. Rep. of Germany

[73] Assignee: ITT Industries, Inc., New York, N.Y.

[21] Appl. No.: 443,082

[22] Filed: Nov. 19, 1982

Related U.S. Application Data

[63] Continuation of Ser. No. 174,769, Aug. 1, 1980, abandoned.

[30] Foreign Application Priority Data

Sep. 10, 1979 [DE] Fed. Rep. of Germany ....... 2936502

[51] Int. Cl.³ .......................... B60T 8/00; B60T 8/18
[52] U.S. Cl. .................................. 303/22 R; 188/345; 188/349; 303/6 C; 74/474
[58] Field of Search ............ 303/6 C, 6 A, 6 R, 22 R, 303/22 A, 52, 24, 84; 74/474, 471 R; 188/349, 195, 217, 354, 16, 345; 60/581, 561, 591; 308/DIG. 8

[56] References Cited

U.S. PATENT DOCUMENTS 3,817,584  6/1974  Huston et al. ...................... 303/6 C
4,101,176  7/1978  Carre et al. ................... 303/22 R X
4,159,853  7/1979  Oberthuer et al. ........... 303/22 R X
4,299,426 11/1981  Hales et al. ......................... 303/6 C

FOREIGN PATENT DOCUMENTS 2614080 10/1976  Fed. Rep. of Germany .
2748699  5/1978  Fed. Rep. of Germany ...... 303/6 C
  92969 12/1968  France ............................. 303/24 A Primary Examiner—Douglas C. Butler
Attorney, Agent, or Firm—James B. Raden; Marvin M. Chaban

[57] ABSTRACT

There are known dual-circuit pressure control valves including a pressure control valve having a stepped piston for each of the dual brake circuits with each of the stepped pistons being subjected to a common control force by a circular compensation member. This known device is, however, insecure in its operation and expensive to manufacture due to the material used and the construction of the parts. These disadvantages are overcome in accordance with the present invention by providing a compensation member in the form of a solid of revolution whose radius of curvature is considerably smaller than the radius of curvature of the supporting surface. The control pistons are disposed in a V-shaped with respect to the compensation member.

42 Claims, 3 Drawing Figures

TWO-CIRCUIT PRESSURE CONTROL UNIT FOR HYDRAULIC BRAKE SYSTEMS

CROSS-REFERENCE TO RELATED APPLICATION

This is a continuation of application Ser. No. 174,769, filed Aug. 1, 1980, now abandoned.

BACKGROUND OF THE INVENTION

The present invention relates to a two-circuit pressure control unit for hydraulic brake systems with two control pistons each disposed in a different one of two brake circuits. With an increasing inlet pressure, each control piston operates a valve closing against the force of a spring, and each control piston has different pressure surfaces on the opposite sides of the valve. The control unit also includes a compensation member which, by means of a surface curved in a circular manner, rests at a supporting surface of a rigid supporting member and on which the two control pistons are supported in a symmetrical arrangement with respect to the center plane of the compensation member, the supporting member preferably being displaceable by a control force.

In a known pressure control unit of this type, for instance, German Patent DE-OS No. 2,614,080, the two control pistons are arranged side by side in a parallel manner. The compensation member is a semi-circular rubber disc of elastic material. By means of the entire circumferential surface of the compensating member, the compensation member rests on a supporting surface having the same radius of curvature. On both sides of the disk, parts of the wall of the supporting member overlap the disk which has a rigid beam at the diameter surface to support the control pistons. The supporting member is held in position by a lever acted upon by a control force which is variable dependent on the axle load of the vehicle.

If the pressure at the outlet ports of the two pressure control units are different, the system which comprises the two control pistons and the compensation member will shift so as to have additional pressure fluid supplied to the lower pressure brake circuit until the pressure balance is restored. Thus, tolerance differences in the manufacture of the two control units may be compensated for up to a certain extent. Further, upon failure of one brake circuit, unhindered operation of the other brake circuit is possible. However, it has to be remembered that the compensation member is an elastic material, in particular rubber. Thus, the compensating member is subject to considerable manifestations of aging and wear. This is particularly the case because of the considerable temperature variations in motor vehicles and because of the strong forces to be absorbed upon any braking action leading to a deformation, or frictional tilting along the supporting surface. Further, there will be difficulties if the action of the two control pistons on the compensation member is not exactly symmetrical.

SUMMARY OF THE INVENTION

An object of the present invention is to provide a two-circuit pressure control unit of the type referred to above which has a simpler compensation mechanism, a more reliable mode of operation and which is virtually free from wear.

A feature of the present invention is the provision of a two-circuit pressure control unit for a dual-circuit hydraulic brake system comprising: two control pistons each disposed in a different one of the dual-circuits and operating to close an associated control valve against an associate spring force upon an increase of inlet pressure; a rigid supporting member having a supporting surface; and a compensation member disposed to abut the supporting surface and to abut each of the control pistons; the control pistons being disposed symmetrically with respect to a central plane of said compensation member with each of the control pistons being inclined with respect to the plane in opposite directions and at the same angle and the compensation member is a rigid solid of revolution whose radius of curvature is less than the radius of curvature of the supporting surface.

In this embodiment, only essentially rigid parts are in a cooperating relationship. Thus, an impairment of the mode of operation due to manifestations of aging and wear will be totally avoided. The transverse movement of the solid of revolution ensuing upon the predominance of the force of one control piston will immediately lead to the desired control of the other control piston. Since the solid of revolution is not rigidly mounted, but rather automatically adopts a certain position upon pressure balance, the usual inaccuracies which result from the positional association of the control pistons and the compensation member will be eliminated.

In particular, the solid of revolution may be a cylinder or a ball, i.e., an element very easily manufactured.

Further, the solid of revolution should be centered by elastic buffers acting on it on both sides, e.g., by a centering ring in the case of a ball. Thus, it will be ensured that the solid of revolution will approximately keep its operating position if it is not loaded.

In a preferred embodiment, the supporting surface is plane. Further, the supporting surface may be formed by the front face of a piston serving as supporting member. This will also lead to a very easy manufacture.

In a preferred embodiment, the solid of revolution at least partially has a surface which reduces the sliding friction. Since the solid of revolution cannot roll off the three surfaces it is acting upon, the unavoidable friction will be kept small.

In particular, the solid of revolution may be of metal at least partially covered by a coating of polytetrafluor ethylene. Another possibility is to have the solid of revolution made completely of a plastic material which reduces the sliding friction, or to provide the solid of revolution with a sliding-friction-reducing lacquer. In all cases, this will not only effect a reduction of the sliding friction, but also increase the corrosion resistance.

It will be of particular advantage for the ball to be provided with a half shell of polytetrafluor ethylene on the side spaced from the supporting surface. The reduced sliding friction at the two control pistons will cause the ball to roll on the supporting surface. Thus, altogether, the total friction will be very small.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
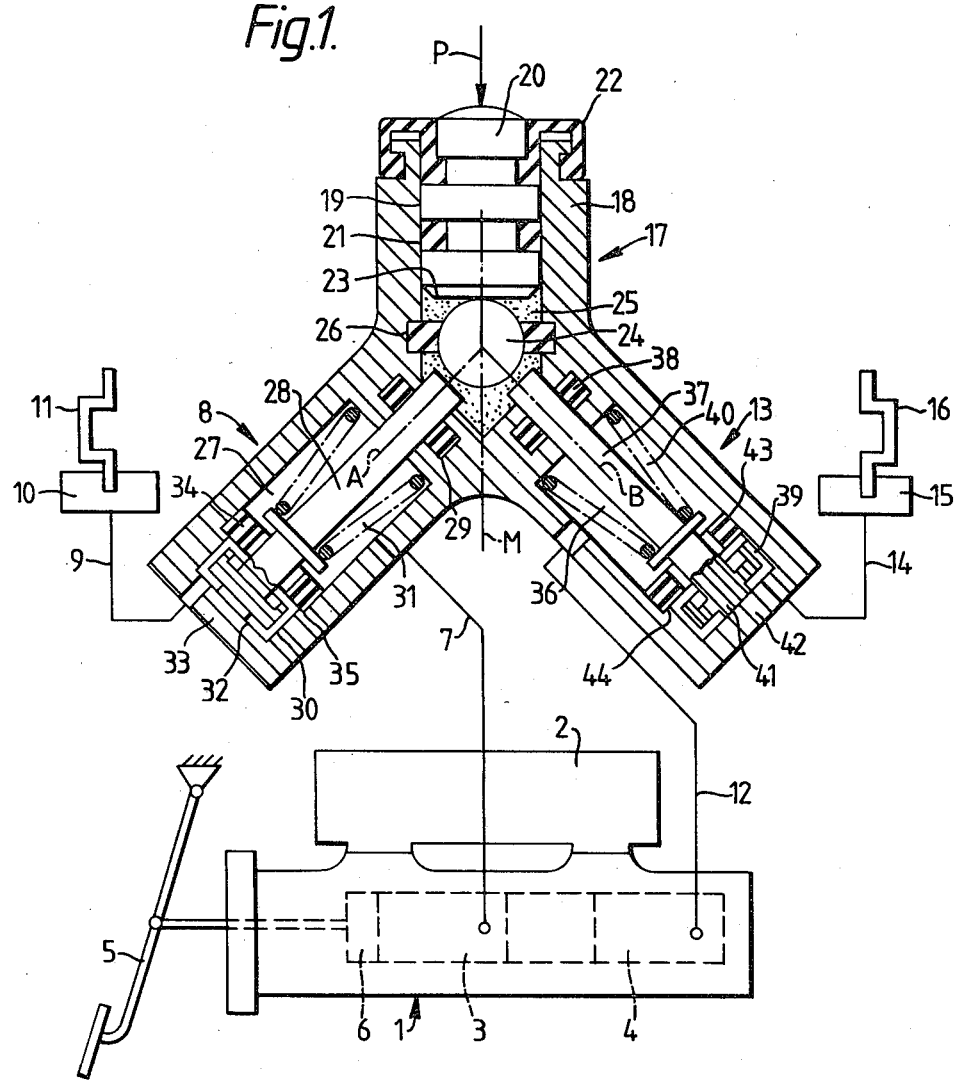
FIG. 1 is a longitudinal cross sectional view of a two-circuit pressure control unit according to the principles of the present invention, showing its connection in a dual hydraulic brake system.

Referring to FIG. 1, the brake system has a tandem master cylinder 1 with a compensation reservoir 2, two outlet chambers 3 and 4, and a brake pedal 5 which directly actuates the piston 6 of the tandem master cylinder. The first outlet chamber 3 is connected to a brake cylinder 10 of a rear wheel 11 via a line 7, a first pressure control unit 8, and an outlet line 9. These parts form a part of a first brake circuit. The outlet chamber 4 is connected to a wheel cylinder 15 of the other rear wheel 16 via a line 12, a second pressure control unit 13, and an outlet line 14. These parts form part of a second brake circuit.

The two pressure control units 8 and 13 are combined to provide a two-circuit pressure control unit 17. A casing 18 has a bore 19 wherein a supporting member 20, constructed as a piston, is slidably held. Member 20 has an annular seal 21 and an end seal 22. The inner front face or end of member 20 forms a supporting surface 23. A ball 24, serving as a compensation member, rests against surface 23. Ball 24 is disposed in a grease chamber 25 and is held by an elastic centering ring 26 in the illustrated central position.

The pressure control unit 8 has a control piston 28 disposed in an inside chamber 27 of the casing 18. Sealed by an O-ring 29, control piston 28 enters the grease chamber 25. Further, control piston 28 carries a valve disk 30 and is loaded by a spring 31, which, in the rest position, forces the front or end face 32 of piston 28 to rest at the bottom 33 of casing 18. An elastic ring 34 serves as a valve seat. Ring 34 rests at a step 35 in casing 18. Similarly, in pressure control unit 13, a control piston 37 is provided in a chamber 36 of casing 18 and enters grease chamber 25 via an O-seal 38. Piston 37 carries a valve disk 39. In the rest position, a spring 40 forces the front or end face 41 of piston 37 to rest at the bottom 42 of casing 18. The valve seat is formed by an elastic ring 43 which is pressed against a step 44 in casing 18. With regard to the center plane M of supporting member 20, the angles of the axes A and B of control pistons 28 and 37 are of the same size, yet inclined in opposite directions.

If during operation brake pedal 5 is pressed down there will be a corresponding pressure increase in both brake circuits, thus, the wheel cylinders are filled with pressure fluid. Since the pressure surfaces of control pistons 28 and 37 are smaller on the sides facing inlet lines 7 and 12, respectively, than on the sides facing outlet lines 9 and 14, respectively, control pistons 28 and 37 will move against the force of springs 31 and 40 in the direction of ball 24. As soon as a predetermined pressure has been achieved, valves 30, 34 and 39, 43 will close, the predetermined pressure either being determined by springs 31 and 40, only, or additionally defined by a force P which acts on supporting member 20. If, subsequently, the pressure in tandem master cylinder 1 is further increased, the pressure in outlet lines 9 and 14 will increase at a reduced rate, due to the different pressure surfaces.

If upon braking there is a drain of pressure fluid, e.g., from wheel cylinder 15 due to leakage and, consequently, a pressure decrease in outlet line 14, there will be a disturbance in the pressure balance at ball 24. Due to the predominance of the force of control piston 28, ball 24 will be displaced to the right-hand side, resulting in control piston 37 being pressed downwards and valve 39, 43 opening. Consequently, there will be a further supply of pressure fluid to wheel cylinder 15, resulting in the previous pressure conditions being restored. A similar action will take place if, upon a braking action, the change-over point is reached earlier in one pressure control unit than in the other one.

If there is a complete failure of one brake circuit, the other brake circuit may continue to operate, unhindered, because ball 24 will support itself on the control piston of the non-operating brake circuit, said control piston remaining in its rest position, so that the other control piston will encounter a sufficient force from ball 24.

Figure 2:
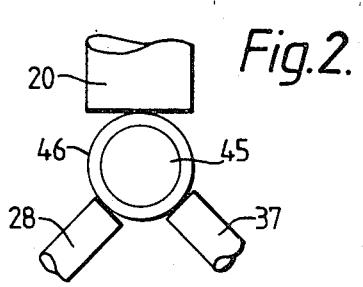
FIG. 2 is a detail of a pressure control unit according to the principles of the present invention having a modified compensation member.

In the embodiment according to FIG. 2, a metal cylinder 45 is provided as the compensation member, the metal cylinder 45 having a coating 46 of polytetrafluor ethylene for the purpose of reducing the sliding friction.

Figure 3:
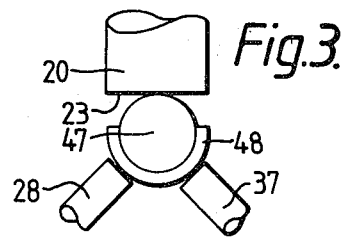
FIG. 3 is a further variation of the compensation member of FIG. 2.

In the embodiment according to FIG. 3, again, a ball 47 serves as the compensation member and is resting in a half shell 48 of polytetrafluor ethylene. In this instance, only the sliding friction between control piston 28 and 37 and ball 47 will be reduced. When in operation, ball 47 may thus roll on supporting surface 23.

While I have described above the principles of my invention in connection with specific apparatus, it is to be clearly understood that this description is made only by way of example and not as a limitation to the scope of my invention as set forth in the objects thereof and in the accompanying claims.

I claim:

1. A two-circuit pressure control unit for a dual-circuit hydraulic brake system comprising:

two control pistons each disposed in a different one of said dual-circuits and operating to close an associated control valve against an associated spring force upon an increase of inlet pressure;

a rigid supporting member having a supporting surface; and a compensation member disposed to abut said supporting surface and to abut each of said control pistons, said control pistons being disposed symmetrically with respect to a central plane of said compensation member with each of said control pistons being inclined with respect to said plane in opposite directions and at the same angle and said compensation member is a whole rigid solid of revolution selected from one of a whole cylinder and a whole ball, said selected one of said cylinder and said ball having a single continuous curved surface in operative relationship with said supporting surface and each of said control pistons.

2. A control unit according to claim 1, wherein said supporting member is displaceable by a control force.

3. A control unit according to claim 1, wherein said solid of revolution is a cylinder.

4. A control unit according to claim 3, wherein said solid of revolution is centered by elastic buffers acting on opposite sides thereof.

5. A control unit according to claim 4, wherein said elastic buffers are a centering ring.

6. A control unit according to claim 5, wherein said supporting surface is a plane surface.

7. A control unit according to claim 6, wherein said supporting member is a piston, and said supporting surface is a plane end surface of said piston adjacent said compensation member.

8. A control unit according to claim 7, wherein said solid of revolution includes at least a surface abutting said control pistons which reduces sliding friction.

9. A control unit according to claim 8, wherein said solid of revolution is a metal member at least partially covered by a coating of polytetrafluor ethylene.

10. A control unit according to claim 4, wherein said supporting surface is a plane surface.

11. A control unit according to claim 10, wherein said supporting member is a piston, and said supporting surface is a plane end surface of said piston adjacent said compensation member.

12. A control unit according to claim 11, wherein said solid of revolution includes at least a surface abutting said control pistons which reduces sliding friction.

13. A control unit according to claim 12, wherein said solid of revolution is a metal member at least partially covered by a coating of polytetrafluor ethylene.

14. A control unit according to claim 4, wherein said supporting member is a piston, and said supporting surface is a plane end surface of said piston adjacent said compensation member.

15. A control unit according to claim 14, wherein said solid of revolution includes at least a surface abutting said control pistons which reduces sliding friction.

16. A control unit according to claim 15, wherein said solid of revolution is a metal member at least partially covered by a coating of polytetrafluor ethylene.

17. A control unit according to claim 4, wherein said solid of revolution includes at least a surface abutting said control pistons which reduces sliding friction.

18. A control unit according to claim 17, wherein said solid of revolution is a metal member at least partially covered by a coating of polytetrafluor ethylene.

19. A control unit according to claim 4, wherein said solid of revolution is a metal member at least partially covered by a coating of polytetrafluor ethylene.

20. A control unit according to claim 1, wherein said solid of revolution is a ball.

21. A control unit according to claim 20, wherein said ball is centered by elastic buffers acting on diametrically opposite sides thereof.

22. A control unit according to claim 21, wherein said elastic buffers are a centering ring.

23. A control unit according to claim 22, wherein said supporting surface is a plane surface.

24. A control unit according to claim 23, wherein said supporting member is a piston, and said supporting surface is a plane end surface of said piston adjacent said compensation member.

25. A control unit according to claim 24, wherein said ball includes at least a surface abutting said control pistons which reduces sliding friction.

26. A control unit according to claim 25, wherein said ball is a metal member at least partially covered by a coating of polytetrafluor ethylene.

27. A control unit according to claim 26, wherein said ball has a half shell of polytetrafluor ethylene disposed on the surface thereof abutting said control pistons.

28. A control unit according to claim 20, wherein said supporting surface is a plane surface.

29. A control unit according to claim 28, wherein said supporting member is a piston, and said supporting surface is a plane end surface of said piston adjacent said compensation member.

30. A control unit according to claim 29, wherein said ball includes at least a surface abutting said control pistons which reduces sliding friction.

31. A control unit according to claim 30, wherein said ball is a metal member at least partially covered by a coating of polytetrafluor ethylene.

32. A control unit according to claim 31, wherein said ball has a half shell of polytetrafluor ethylene disposed on the surface thereof abutting said control pistons.

33. A control unit according to claim 20, wherein said supporting member is a piston, and said supporting surface is a plane end surface of said piston adjacent said compensation member.

34. A control unit according to claim 33, wherein said ball includes at least a surface abutting said control pistons which reduces sliding friction.

35. A control unit according to claim 34, wherein said ball is a metal member at least partially covered by a coating of polytetrafluor ethylene.

36. A control unit according to claim 35, wherein said ball has a half shell of polytetrafluor ethylene disposed on the surface thereof abutting said control pistons.

37. A control unit according to claim 20, wherein said ball includes at least a surface abutting said control pistons which reduces sliding friction.

38. A control unit according to claim 37, wherein said ball is a metal member at least partially covered by a coating of polytetrafluor ethylene.

39. A control unit according to claim 38, wherein said ball has a half shell of polytetrafluor ethylene disposed on the surface thereof abutting said control pistons.

40. A control unit according to claim 20, wherein said ball is a metal member at least partially covered by a coating of polytetrafluor ethylene.

41. A control unit according to claim 40, wherein said ball has a half shell of polytetrafluor ethylene disposed on the surface thereof abutting said control pistons.

42. A control unit according to claim 20, wherein said ball has a half shell of polytetrafluor ethylene disposed on the surface thereof abutting said control pistons.

* * * * *